Figure 1:
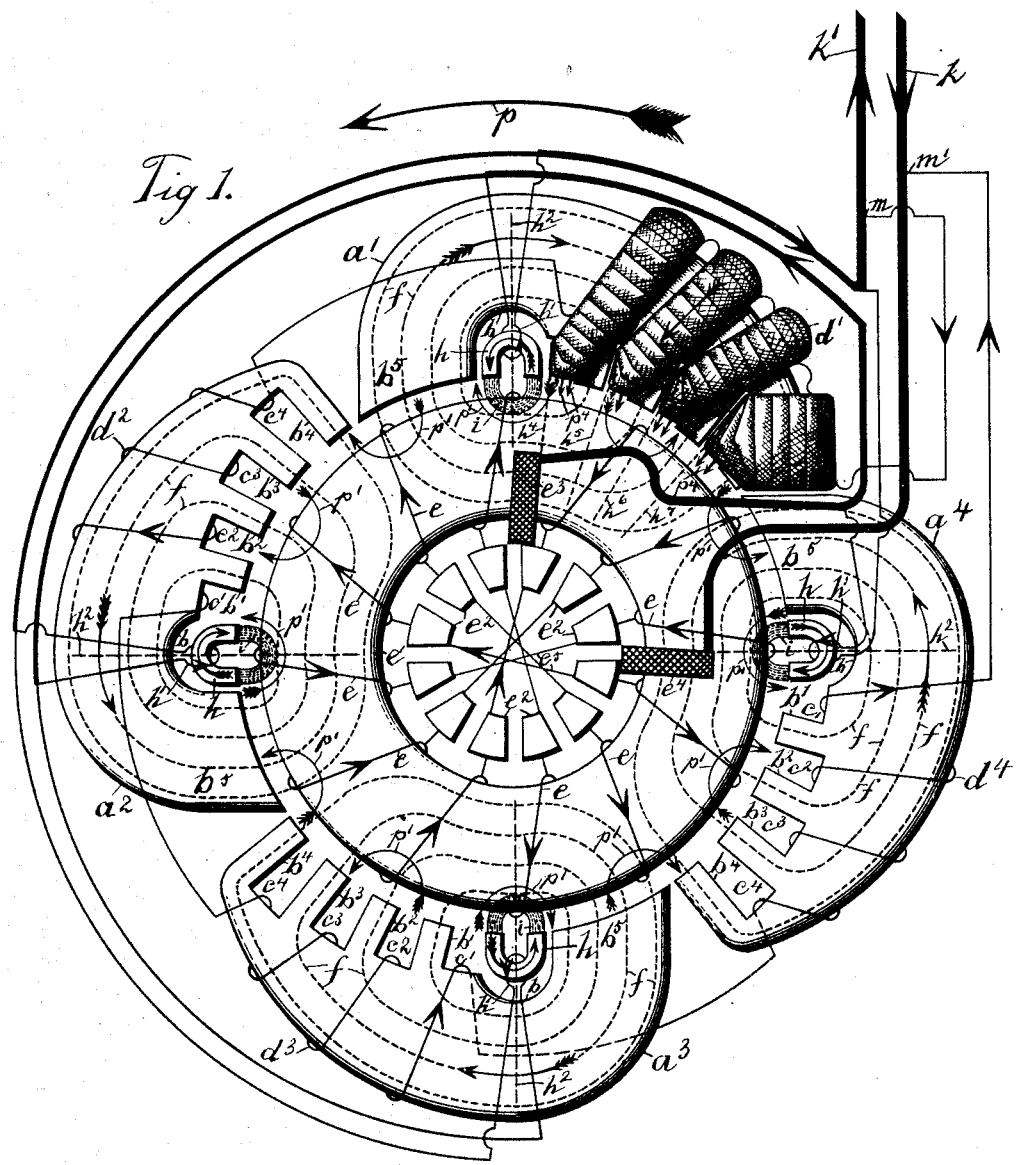

(No Model.) 4 Sheets—Sheet 1.
A. W. SMITH.
DYNAMO OR MOTOR.

No. 586,459. Patented July 13, 1897.

Witnesses:
Robt T Platt
J Harry Glick

Inventor:
Albert W. Smith (No Model.) 4 Sheets—Sheet 2.
A. W. SMITH.
DYNAMO OR MOTOR.
No. 586,459. Patented July 13, 1897.
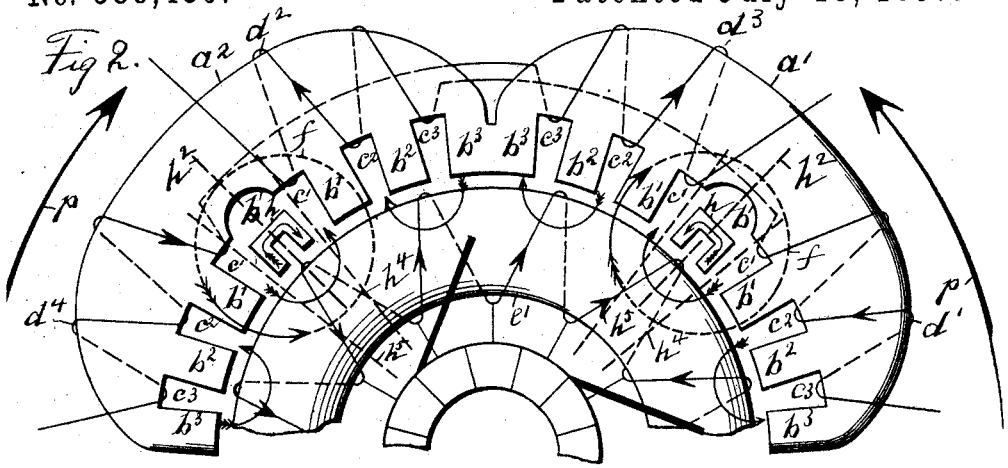
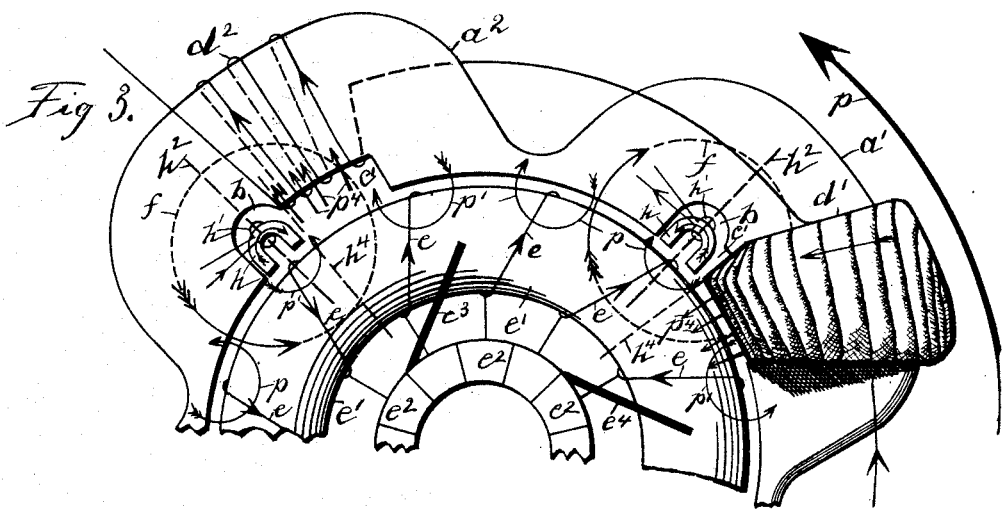
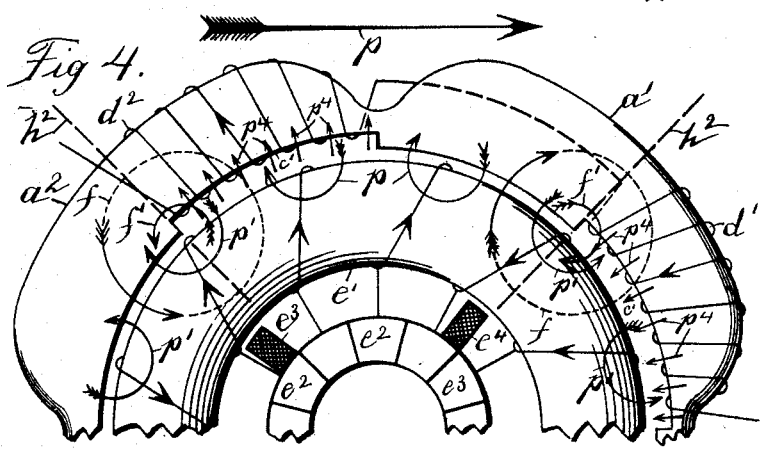
Witnesses:
Rob† T. Platt
Harry Glick
Inventor:
Albert W. Smith

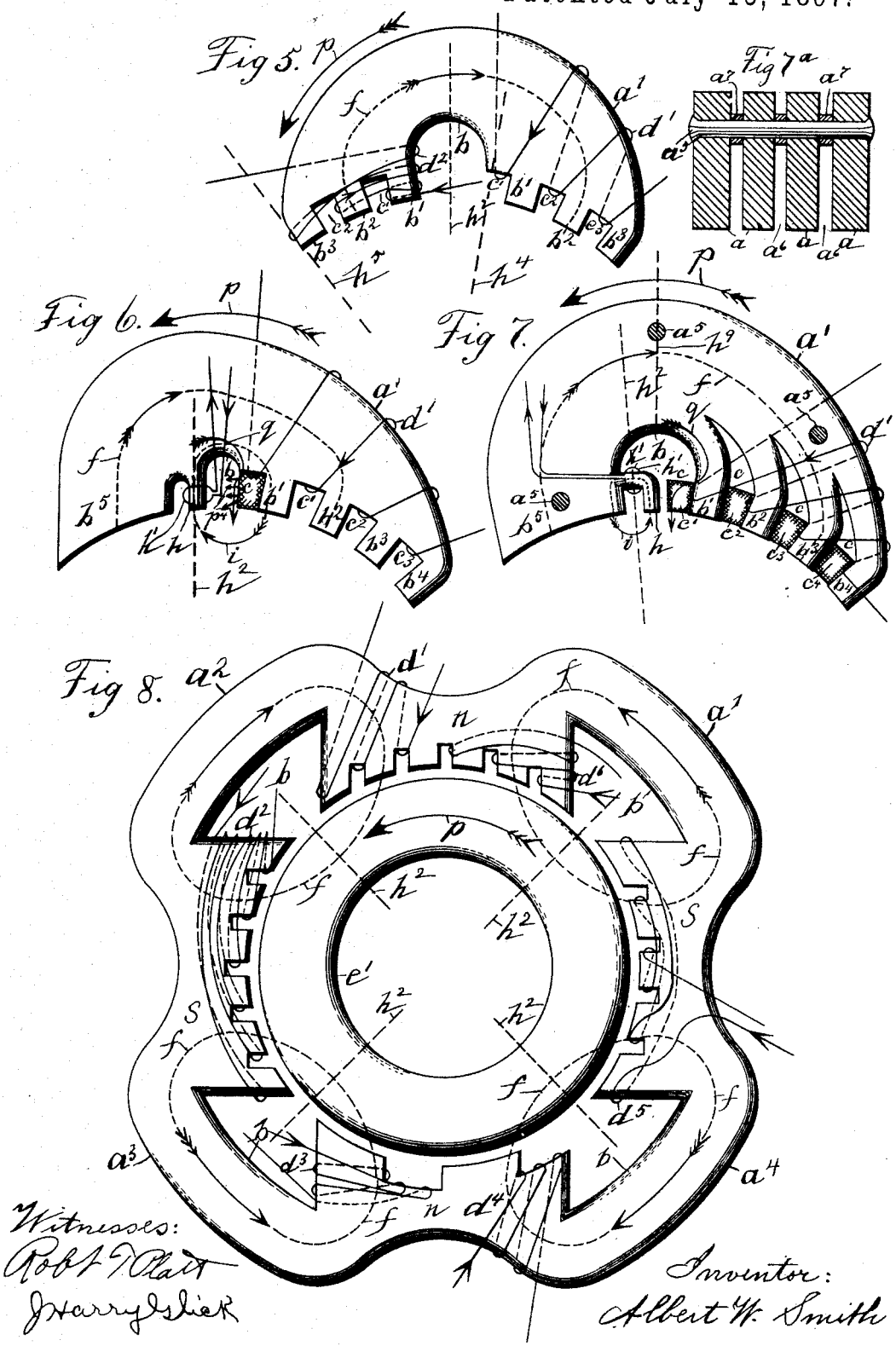

(No Model.) 4 Sheets—Sheet 4.

A. W. SMITH.
DYNAMO OR MOTOR.

No. 586,459. Patented July 13, 1897.

Witnesses:
Robt T Platt
J Harry Slick

Inventor:
Albert W. Smith

UNITED STATES PATENT OFFICE.

ALBERT W. SMITH, OF WASHINGTON, DISTRICT OF COLUMBIA.

DYNAMO OR MOTOR.

SPECIFICATION forming part of Letters Patent No. 586,459, dated July 13, 1897.

Application filed May 3, 1897. Serial No. 634,884. (No model.)

*To all whom it may concern:*

Be it known that I, ALBERT W. SMITH, a citizen of the United States, residing at Washington, in the District of Columbia, have invented new and useful Improvements in Electrical Generators or Motors, and the following is a specification thereof.

The general object of this invention is to produce an electrical generator or motor having a greatly-increased output or effectiveness per unit of weight over that obtained in present practice, also having a greater electrical efficiency and entire freedom from shifting of the neutral or commutating points and the sparking, overheating, and faulty regulation resulting therefrom.

To these ends the invention consists in so constructing the field-magnets and so winding the field-magnet coils that the angular shifting of the neutral or commutating points caused by field distortion due to the magnetic reaction of the armature-currents is entirely prevented, thus eliminating the necessity for a wide so-called "neutral" (really a field-shifting) space. The armature-coils occupying this wide neutral or field-shifting space do not produce any useful effect, but, on the contrary, they consume energy and produce heat, and they also contribute greatly to the field distortion and the consequent sparking, overheating, and faulty regulation, thus tending only to limit the output of the machine and to reduce its electrical efficiency and general reliability. It is obvious that the elimination of these worse than idle armature-coils will greatly increase the possible output of the machine as well as its electrical efficiency.

The above-described results are obtained by the employment of a field-magnet of peculiar form, which permits of winding the field magnetizing-coils contiguous to the armature and entirely on that side of the neutral or commutating points on which the armature-coils have a current opposite in direction to the current in those parts or laps of the field-coils which lie contiguous to the armature.

To prevent sparking at the brushes due to self-induction in the armature-coils at the moment of commutation, the invention consists in the employment of small electromagnets placed at the neutral or commutating points and adapted to surround or embrace the armature-coils in the positions of and at the moment of commutation with a magnetic field contrary in direction and equal or superior in strength to the local magnetic fields which said armature-coils set up or tend to set up at the moment of commutation.

Figure 11:
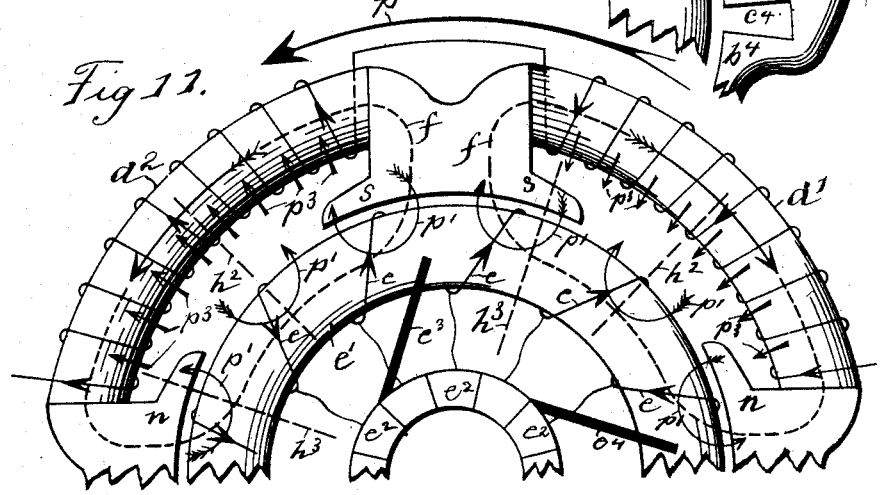

In the drawings herewith, Figure 1 is a front view of a machine embodying my invention. Figs. 2, 3, 4, 5, 6, 7, 7$^a$, 8, 9, and 10 illustrate modifications thereof. Fig. 11 is an explanatory diagram.

In all the views the same letters indicate like or corresponding parts.

In Fig. 1, $a'$, $a^2$, $a^3$, and $a^4$ are field-magnets, each having a neutral space or gap $b$, and at one side thereof a plurality of inwardly-projecting poles $b'$, $b^2$, $b^3$, and $b^4$, forming between them coil-spaces $c'$, $c^2$, $c^3$, and $c^4$, while at the other side of neutral gap $b$ they have a single wide pole $b^5$.

$d'$, $d^2$, $d^3$, and $d^4$ are field magnetizing-coils, each wound in four sections, as shown on magnet $a'$, through the spaces $c'$, $c^2$, $c^3$, and $c^4$ and connected to form a single coil for each magnet, as shown. The field-coil $d'$ on magnet $a'$ is shown fully wound, while in coils $d^2$, $d^3$, and $d^4$ each coil-section is represented by a single turn of wire wound through spaces $c'$, $c^2$, &c.

$e'$ is the armature, wound with coils $e\ e\ e$, connected to segments $e^2\ e^2$, as shown.

$e^3$ is the positive brush, and $e^4$ is the negative brush.

The commutator is cross-connected, as shown, by wires $e^5$, thus requiring but two brushes.

The endless dotted lines $ff$ and the arrows forming part thereof show the form and direction of the magnetic fields.

$h\ h$ are small electromagnets wound with coils $h'\ h'$ and placed in the neutral gaps $b\ b$ at points coinciding with the neutral or commutating lines $h^2\ h^2$. The magnetic fields $i\ i$ of magnets $h\ h$ have the direction shown by arrows thereon, and they surround, interlink with, or embrace, but do not intercept, cut, or cross those of the coils $e\ e$, which are for the time being in the neutral or commutating positions.

The direction of current-flow in all the coils and circuits is shown by arrow-heads thereon. The circuits through the machine are as follows: Beginning at the negative terminal $k$ it is to negative brush $e^4$, then through the armature in four parallel circuits, as shown by arrow-heads on coils $e\ e\ e$, then out at positive brush $e^3$ and in multiple are through the four coils $h'\ h'$, and out at positive terminal $k'$. The field-circuit beginning at $m$ is through coils $d'$, $d^2$, $d^3$, and $d^4$ in series, as shown by arrow-heads thereon, and back to point $m'$. The arrow $p$ shows the direction in which the armature $e'$ rotates.

In the explanatory diagram Fig. 11 is shown one of the common forms of dynamo design for the purpose of illustrating the field distortion due to armature reaction. The field-coils $d'$ and $d^2$ are wound symmetrically with relation both to the poles $n$ and $s$ and the theoretical neutral lines $h^2\ h^2$.

When the machine is run as per arrow $p$, the direction of the current in the armature-coils $e\ e$ is as shown by arrow-heads thereon and the direction of the magneto-motive forces set up by the armature-coils is as shown by the curved arrows $p'\ p'$.

The field magnetism tends to enter or leave the armature on those sides of the armature-coils $e\ e$ on which their magneto-motive forces, as shown by arrows $p'\ p'$, have the same direction as the field magnetism.

In a generator the magneto-motive forces of the armature-coils are always in such a direction as to cause a forward shifting of the field magnetism, varying in amount with the strength of the armature-current. If the armature-current is great enough, the field magnetism is distorted and caused to leak through the coil-windings, as shown by arrows $p^3\ p^3$, as far forward as the points indicated by lines $h^3\ h^3$, which then become the commutating-points.

It is obvious that the magnetism of coils $d'$ and $d^2$, Fig. 11, can be shifted forward on its circumferential line of ingress or egress from said coils only through a distance equal to their own width, as shown by lines $h^3\ h^3$. It is also obvious that the magnetism generated in any given turn or section of said coils must pass through said turn or section, but need not necessarily pass through all the turns or sections of said coils.

Referring now to Fig. 1, the coils $d'\ d^2$, &c., are entirely back of the neutral lines $h^2\ h^2$ of their respective magnets, and they are wound contiguous to those of the armature-coils having current of opposite direction in the air-gap to that in the field-coils. Referring now to coil $d'$, the magnetism generated in the section wound in space $c'$ nearest the neutral gap $b$ flows through the pole $b'$ and can be distorted forward, as shown by small arrows $p^4$, under magnet $a'$ only as far as the dotted line $h^4$ under magnet $a'$. The magnetism generated in the next section and wound in space $c^2$ can be displaced only as far as dotted line $h^5$ under magnet $a'$, while the magnetism of the sections wound in spaces $c^3$ and $c^4$ can likewise be shifted only as far as dotted lines $h^6$ and $h^7$, respectively. It is therefore evident that no matter how great the armature-current and its reactive tendency may be the neutral lines $h^2\ h^2$ cannot be shifted, and therefore the points of commutating remain constant under all conditions of load. It is also obvious that the width of the neutral space may be limited to a mere point, thus eliminating the inactive armature-coils and thereby enhancing the output and efficiency of the machine. It is desirable to have a constant magnetic reluctance at all points of the magnetic circuit of magnets $a'\ a^2$, &c. This result is obtained by making the plural poles $b'$, $b^2$, $b^3$, and $b^4$ equal in combined cross-sectional area to the single poles $b^5$.

It will be seen from Fig. 1 that the magnetic paths of the several plural poles of the same magnet are of unequal length, that of pole $b'$ being the shortest and that of pole $b^4$ being the longest. It is also apparent that a turn of wire wound through a space $c'$ is longer and therefore more effective than a turn wound through a space $c^4$. It is, however, desirable to have the same strength of magnetism through all the several plural poles. This result is achieved by winding in each of the several coil-spaces the necessary number of ampere-turns, the number of turns increasing as the turns become shorter and the magnetic circuits become longer. To enable this being done, the coil-spaces $c'$, $c^2$, $c^3$, and $c^4$ are made successively deeper, as shown in Fig. 1, to accommodate the successively-increasing number of turns required.

In the present practice of dynamo design the self-induction in the armature-coils at the moment of commutation is neutralized or counteracted by subjecting the coils at the moment of commutation to an opposing dynamic or translation induction. This is usually accomplished by shifting the brushes forward to positions where they will cut, cross, or intercept the required strength and direction of magnetic field.

The method employed by me differs radically from the foregoing, inasmuch as the self-induction is neither neutralized nor counteracted by dynamic or translation induction, but is entirely prevented by surrounding, embracing, or interlinking those of the armature-coils $e\ e$, Fig. 1, which coincides with the neutral lines $h^2\ h^2$ at their moments of commutation, as shown in Fig. 1, by their respective commutator-segments just leaving or having left brushes $e^3$ and $e^4$ with the magnetic fields $i\ i$, produced by magnets $h\ h$. At the moment of commutation the armature-coils $e\ e$ tend to set up local magnetic fields having the direction shown by arrows $p'$, which show the direction of the magneto-motive forces of the armature-coils. The magnetic fields $i\ i$ have, as shown by arrows on magnets $h\ h$, a contrary direction to the magneto-motive forces represented by arrows $p'$.

It is obvious that if the fields $i\ i$ are equal or superior in strength to those which the armature-coils $e\ e$ tend to set up then no self-induction can possibly take place, for the existence of self-induction in a coil depends upon the presence of a magnetic flux, and my invention consists in preventing this flux by one of contrary direction. It is obviously not absolutely necessary that the fields $i\ i$ be equal or superior in strength to those which coils $e\ e$ tend to set up, for evidently a small amount of self-induction will not cause sparking. I prefer, however, to have the fields $i\ i$ exactly equal in strength to those which coils $e\ e$ tend to set up. This result is obtained by placing on magnets $h\ h$ the same number of ampere-turns as are contained in armature-coils $e\ e$.

In Fig. 1 the armature-coils $e\ e$ have each a single turn and there are four parallel paths through the armature, while the coils $h'\ h'$ also have each a single turn and form four parallel paths for the armature-current. This arrangement insures a perfect balance under all conditions of load between fields $i\ i$ and the local fields which coils $e\ e$ tend to set up at the moment of commutation.

It is assumed that the fields $i\ i$ will not be shifted by the armature-current and that the relation between them, those of the coils $e\ e$ being commutated, and the neutral lines $h^2\ h^2$ will be as shown in Fig. 1. If in practice a shifting of the fields $i\ i$ takes place, then the brushes $e^3$ and $e^4$ must be shifted accordingly, the essential conditions being that the fields $i\ i$ shall surround or envelop, but not cut or sweep across the coils $e\ e$ at the moment that they are undergoing commutation.

In Fig. 2 is shown a form of field-magnet adapted for use with reversible machines. The field-magnets $a'$ and $a^2$ have a plurality of poles $b'\ b^2$, &c., on each side of the neutral gap $b$. If the armature is rotated as shown by the arrow $p$ on the right, the coils $d'$ and $d^2$ are used and coils $d^3$ and $d^4$ are out of use. Under these conditions the magnetism cannot shift beyond dotted lines $h^4\ h^4$, while if armature $e'$ is rotated as shown by arrow $p$ on the left the coils $d^3$ and $d^4$ are used and coils $d'$ and $d^2$ are out of use, and the magnetism is then prevented from shifting beyond lines $h^5\ h^5$. This form of magnet and winding is adapted for railway and hoisting motors and reversible machines in general.

Figure 9:
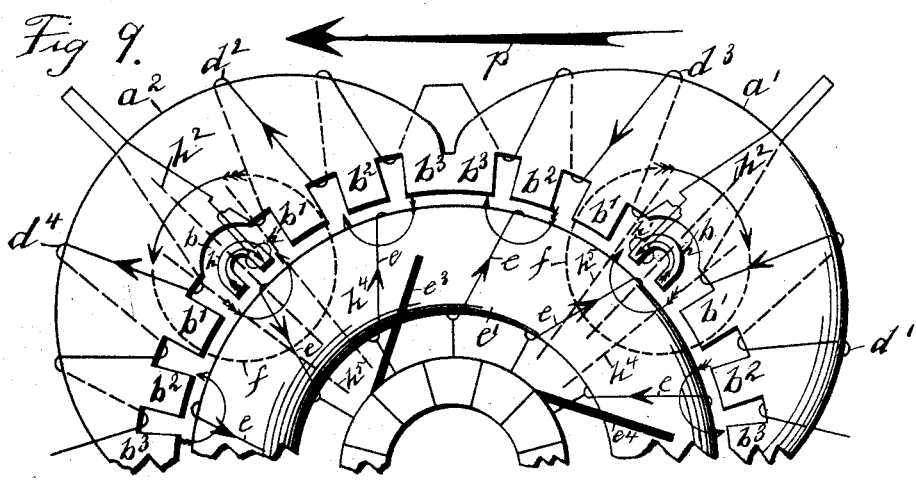

In Fig. 9 is shown a similar construction in which the coils $d'$, $d^2$, $d^3$, and $d^4$ are all connected in a single circuit. If the armature is rotated as per arrow $p$, all of the field-coils serve to magnetize the magnets $a'$ and $a^2$, but only coils $d'$ and $d^2$ tend to prevent field distortion, the coils $d^3$ and $d^4$ tending to add to the distortion. The magnetism can, however, only be distorted as far as the dotted lines $h^4$ and $h^5$, respectively, in either direction. This form of machine will run equally well in either direction. The coils $h'$ of magnet $h$ are shown connected in series with the field-coils. This is an alternative construction to that shown in Fig. 1.

In Fig. 2, $h\ h$ are permanent magnets adapted to perform the same function as magnets $h\ h$ in Fig. 1. This is an alternative construction producing similar results and is adapted for small machines.

In Fig. 3 is shown a form of field-magnets $a'$ and $a^2$ having each but a single coil-space $c\ c$, in which are wound the coils $d'$ and $d^2$. If the armature is rotated as per arrow $p$, the magnetism will leak through the coil, as shown by arrows $p^4$, but can only be distorted as far as indicated by dotted lines $h^4\ h^4$, thus securing the same results as the winding shown in Fig. 1.

In Fig. 4 is shown a form of field-magnets $a'$ and $a^2$ having no neutral gaps, but only a single wide coil-space $c'$ extending from the neutral lines $h^2\ h^2$ forward to the end of the magnets and wound each with a single coil $d'$ and $d^2$. If the machine is used as a generator and the armature $e'$ is rotated contrary to arrow $p$, the magnetism can only be distorted as far as the neutral lines $h^2\ h^2$. If, however, the machine is supplied with current, as shown by arrow-heads on the coils, the armature rotates as shown by the arrow $p$. When any machine is used as a motor, the armature-coils are commutated in the contrary direction to that in a generator, and the local fields represented by arrows $p'$, which they tend to set up, are opposed in direction to the field magnetism $f\ f$ and no self-induction can therefore take place. It is therefore in a motor not necessary to use the magnets $h\ h$, Fig. 1, nor any other special device for this purpose, but only to so arrange matters that there shall be no neutral space or gap $b$ in which the armature-coils may set up their local fields, when self-induction will be entirely prevented by the opposing direction of that portion of the main fields represented by small arrows $f'$. This is accomplished in Fig. 4 by winding coils $d'$ and $d^2$ right up to neutral lines $h^2\ h^2$, thus insuring the absence of a neutral space.

In Fig. 5 the magnet $a'$ has plural poles $b'\ b^2$, &c., on each side of the neutral gap $b$. Those on the right of gap $b$ are wound with a coil $d'$, as in Fig. 1, while those on the left of gap $b$ are wound with coil $d^2$, with the return-laps wound through neutral space $b$. For a generator the armature must be rotated as per arrow $p$, when coil $d'$ prevents the magnetism from shifting past line $h^4$, while coil $d^2$ prevents shifting past line $h^5$.

In Fig. 6 the magnet $a'$ is wound with coil $d'$, as in Fig. 1. $h$ is a commutating pole projecting from neutral space $b$ and is wound with coil $h'$, having current, as indicated by arrow-heads thereon, and setting-up magnetism, as represented by arrow $i$, having the same direction as that of coil $d'$, represented by the dotted line $f$ and the arrow forming part thereof. With this method commutation takes place on the line $h^2$ and the coils being commutated cut, intercept, or sweep across the magnetic field $i$ set up by coil $h'$, and thus their self-induction is neutralized or counteracted. This method of commutation has often been tried in connection with dynamos as now designed, but has not succeeded because of the magnetic field distortion present in all dynamos of present design. With my system of field-winding, however, which prevents field distortion, this method of commutation is entirely successful and may be used as an alternative to the method shown in Fig. 1.

In Fig. 6 the arrow $q$ shows how the magnetism may, when the armature-current is very strong, enter a coil represented by the shaded area $c$ and strike across the neutral gap $b$, as shown by arrows $p^4$.

In Fig. 7 the magnet $a'$ is composed of sections $a\ a\ a$, Fig. $7^a$, which is a section on line $h^9$, Fig. 7. The sections $a\ a\ a$ are secured together by rivets $a^5$ and separated by distance-washers $a^7\ a^7$ to form the ventilating air-spaces $a^6\ a^6$.

The magnet $a'$, Fig. 7, is wound with coil $d'$, the several coil-sections being wound to the depth shown by the dotted areas $c'$, $c^2$, $c^3$, and $c^4$, leaving above them the ventilating air-spaces $c\ c\ c\ c$, which together with the air-spaces $a^6\ a^6$, Fig. $7^a$, form ample cooling or air-circulating spaces for the coil-sections. Another advantage of the air-spaces $c\ c\ c$, or the absence of the iron above the coils, as present in Fig. 6 and all the other views, is that the magnetism, as shown by the arrow $q$ in Fig. 7, cannot enter the coil so far forward as is the case when no air-spaces are used and as is shown by arrow $q$ in Fig. 6. It is obvious that with the air-space $c$ above the coil-winding represented by shaded area $c'$ in Fig. 7 the magnetism can only enter the coil as shown by arrow $p$ and not as shown by arrow $q$ in Fig. 6. The magnetic leakage represented by arrows $p^4$ in Fig. 6 can therefore not occur to the same extent. In Fig. 7, $h$ is a magnetic pole projecting from the side of the neutral gap $b$ and is wound with coil $h'$, having current, as shown by arrow-heads thereon, and inducing magnetism, as per arrow $i$, contrary in direction to that of coil $d'$, as represented by dotted line $f$ and the arrows forming part thereof. $h^2$ is the line on which commutation takes place. The operation of this device is similar to that of magnets $h\ h$, Fig. 1, and forms an alternative construction thereto.

In Fig. 8 the magnets $a'$, $a^2$, $a^3$, and $a^4$ form a magnet-frame similar to a type much used in the present practice of dynamo design and having inwardly-pointing poles $n\ s\ n\ s$, which in the prevailing practice are usually surrounded with machine-wound coils.

Fig. 8 illustrates the several modes of applying the magnetizing-coils according to my invention. The coil $d'$ is like that shown in Fig. 1, being wound through coil-spaces in the magnet-face and having the returning laps wound around outside of the magnet. Coils $d^2$ and $d^6$ are like coil $d^2$ in Fig. 5, they being wound through coil-spaces in the magnet-face and back around poles $n$ and $s$ through the neutral spaces $b\ b$. Coil $d^4$ is like those shown in Fig. 3, it being wound through a single coil-space and back around the outside of the magnet. Coil $d^3$ is both like those shown in Fig. 3 and like coil $d^2$, Fig. 5, it being wound through a single coil-space, like those shown in Fig. 3, and having its return-laps in the neutral gap $b$, as shown in coil $d^2$, Fig. 5. Coil $d^5$ is wound back and forth, as shown, in coil-spaces of pole $s$ and is unlike any of the coils shown in the other views, but it is electrically equivalent to coils $d^2$ and $d^3$ in Fig. 9 combined, the laps on the pole-face and the direction of the currents therein having the same relation to the magnetic fields $f\ f$ in both views.

Figure 10:
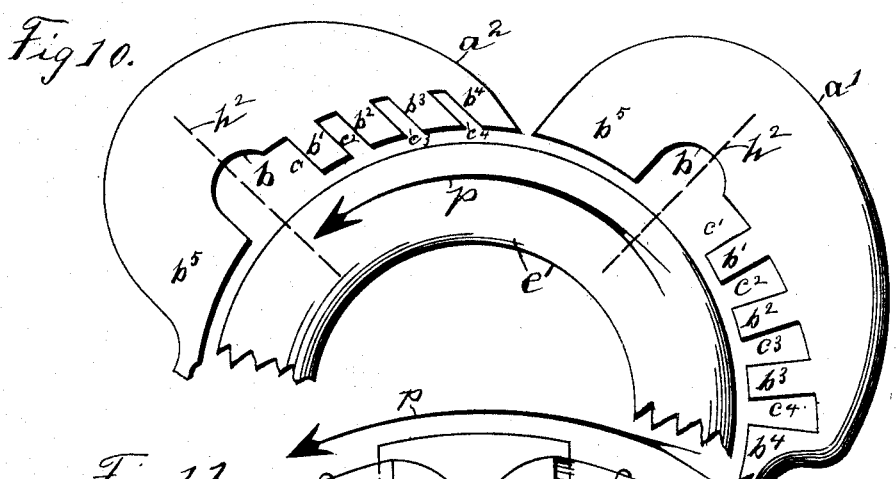

In Fig. 10 magnets $a'$ and $a^2$ show two contrasting forms of coil-spaces. In the magnet $a'$ the trapezoidal coil-spaces $c'$, $c^2$, $c^3$, and $c^4$ have successively-increasing depths to admit of winding therein the successively-increasing number of turns necessary to produce in all the plural poles the same magnetic field strength, as already described in connection with Fig. 1. The coil-spaces $c'$, $c^2$, $c^3$, and $c^4$ of magnet $a^2$ are of parallel width and have a successively-diminishing area, that nearest gap $b$ being largest in area, while that most remote therefrom, as $c^4$, has the least area. This form of magnet is well adapted for constant-current machines in which the armature reaction is constant and not very great and wherein, consequently, the magnetism generated in the coil-section wound in space $c'$ is not all forced through plural pole $b'$, but some of which may pass on and flow through poles $b^2$, $b^3$, and $b^4$, thus requiring successively fewer turns in spaces $c^2$, $c^3$, and $c^4$ than in space $c'$, and consequently successively less area in said spaces. For constant-potential machines, however, in which the armature reaction is very great and constantly changing with the load on the machine the form of coil-spaces shown in magnet $a'$ is necessary.

I am aware that the field distortion due to armature reaction has heretofore been combatted or opposed by winding coils carrying opposing currents contiguous to the armature; but these devices have in all cases consisted of special coils containing approximately the same number of ampere-turns as the armature-winding and having their magnetic axis coinciding with the magnetic axis of the armature-winding. These special coils operate to combat or oppose the field distortion due to armature reaction by neutralizing or counteracting the magneto-motive forces which the armature-windings tend to set up by the equal and opposing magneto-motive forces of said special coils.

In practice the above-described devices have not proven a signal success, owing to the mechanical difficulty and great cost of applying said special coils, and also owing to the fact that since the special coils must carry the entire armature-current an amount of copper equal to that on the armature is required in said special coils and an equal amount of energy is consequently consumed therein, producing also an equal amount of heat as is produced in the armature-coils. By the use of these special coils the magnetic circuits of the field-magnets are also much lengthened, thus requiring more energy in the field-coils than would otherwise be necessary. The output of a machine can therefore not be materially enhanced by the use of these special coils, while the electrical efficiency is obviously reduced by the amount of energy consumed in the special coils and by the greater energy necessitated in the field-coils.

In my invention the field distortion is not prevented by neutralizing or counteracting the magneto-motive forces of the armature-windings; but advantage is taken of the fact that the magnetism of a coil or section of a coil cannot be distorted or shifted further than the width of said coil or section of said coil, and the further fact that the magnetism generated in any given turn or section of a coil must pass through said turn or section, but need not necessarily pass through all of the turns or sections of said coil, as explained in connection with Fig. 11.

My invention accordingly consists in so winding the field magnetizing-coils on the field-magnets and in so placing them relatively to the armature-windings and to the neutral or commutating points that their magnetism is caused to be diverted from the general magnetic axis of said coils by causing the magnetism generated by the several turns or sections of said coils to leak out through the sides of said coils, between the several turns or sections thereof, thus insuring the result that the field-magnetism can be distorted or shifted by the armature-current only to a very limited and harmless extent.

Having now fully described my invention and several modifications thereof, I desire to state that many other modifications thereof are possible, which will readily suggest themselves to those competent in the electrical and machine arts.

No claim is made herein to the specific structures shown in Figs. 2, 3, 4, 6, 7, and 9, as all of these will form the subject-matter of separate applications.

What I claim as my invention is—

1. In an electrical generator or motor, the method of preventing the shifting of the neutral or commutating points, which method consists in causing the magnetism of an asymmetrically-wound field magnetizing-coil to be diverted from the general magnetic axis of said coil, by causing the magnetism generated by the several turns or sections of said coil to leak out through the sides of said coil, between the several turns or sections thereof.

2. In an electrical generator or motor, the method of preventing the shifting of the neutral or commutating points, caused by field distortion, due to armature reaction, which method consists in producing a prior, antecedent, and self-constituted distortion between a field magnetizing-coil and its field, and thus limiting the amount of further distortion which may be caused by the armature reaction.

3. In an electrical generator or motor, the method of preventing the shifting of the neutral or commutating points, which method consists in placing all of those laps or portions of the field magnetizing-coils which lie contiguous to or near the armature, in or across the flux path of the magnet, and entirely on those sides of the neutral or commutating points of the field-magnet, on which the armature-coils have currents of opposite direction to the current in the contiguous laps or portions of the field-coils.

4. In an electrical generator or motor, the method of preventing the shifting of the neutral or commutating points, which method consists in juxtaposing all of those laps or portions of the field magnetizing-coils which lie contiguous to or adjacent to the armature, near to or in proximity to those of the armature-coils which have magneto-motive forces of contrary direction to those in the juxtaposed or contiguous laps of the field-coils.

5. In an electrical generator or motor, a field magnetizing-coil having some of its laps or portions wound contiguous to the armature, said contiguous portions being wound entirely on that side of the neutral or commutating point of the field-magnet on which the armature-coils have currents of opposite direction to the current in the said contiguous laps or portions of said field-coil.

6. In an electrical generator, the method of preventing the shifting of the neutral or commutating points, caused by field distortion, due to armature reaction, which method consists in displacing the field magnetizing-coils relative to the neutral or commutating points of the field-magnets, and inversely to the direction of rotation of the armature.

7. In an electrical generator or motor, a field-magnet having on one side of its neutral gap or point a single wide pole, and on the other side of said neutral gap or point several plural poles, said plural poles forming between them coil-containing spaces, said spaces being contiguous to the armature.

8. In an electrical generator or motor, a field-magnet having on one side of its neutral gap or point a single wide pole or polar area, and on the other side of said neutral gap or point a coil-containing space or spaces, said space or spaces being contiguous to the armature.

9. In an electrical generator or motor, a field-magnet having on one side of its neutral gap or point a single large pole, or polar area, and on the other side of said neutral gap or point a coil-containing space or spaces, said space or spaces being contiguous to the armature and containing portions or laps of the field-magnet coils, the returning laps or portions of said coils being situated at points remote from the armature.

10. In an electrical generator or motor, a field-magnet having on one side of its neutral gap or point a single wide pole, and on the other side of said neutral gap or point several plural poles, said plural poles forming between them coil-containing spaces, said spaces being contiguous to the armature, and containing portions or laps of the field-magnet coils, the returning laps or portions of said coils being wound around the outside of said magnet and remote from the armature.

11. In an electrical generator or motor, the method of preventing the existance of self-induction due to the rise or increase of current in the commutable coils at the moment of commutation, or when their respective commutator-segments leave, or break contact with the brushes, which method consists in forestalling or anticipating said self-induction in said commutable coils by surrounding, embracing, enveloping, or interlinking said commutable coils at the moment of commutation with a prior or antecedent magneto-motive force of contrary direction to that which exists or tends to exist in the commutable coils at the moment of commutation.

12. In an electrical generator or motor, the method of preventing self-induction in the commutable coils at the moment of commutation, which method consists in surrounding, embracing, or interlinking said commutable coils at the moment of commutation with a magnetic field contrary in direction to the local magnetic fields which said commutable coils tend to set up at the moment of commutation.

13. In an electrical generator or motor, the method of preventing self-induction in the commutable coils at the moment of commutation, which method consists in surrounding, embracing, or interlinking the commutable coils at the moment of commutation with a magnetic field contrary in direction, and equal or superior in strength to the local magnetic fields which said commutable coils tend to set up at the moment of commutation.

14. In an electrical generator or motor, the combination with the commutable coils thereof, of means for surrounding, embracing, or interlinking said commutable coils at their moments of commutation with a magnetic field contrary in direction to the local magnetic fields which said commutable coils tend to set up at the moment of commutation.

15. In an electrical generator or motor, the combination with the commutable coils thereof, of means for surrounding, embracing, or interlinking said commutable coils at their moments of commutation with a magnetic field contrary in direction, and equal or superior in strength to the local magnetic fields which said commutable coils tend to set up at their moments of commutation.

16. In an electrical generator or motor, the combination with the commutable coils $e\ e$ thereof, of electromagnets $h\ h$ wound with an equal number of ampere-turns as are contained in said commutable coils $e\ e$.

ALBERT W. SMITH.

Witnesses:
    D. P. COWL,
    J. W. STERNER.